Feb. 6, 1923.
W. A. HAYDEN.
DUPLEX FRICTIONAL TRANSMISSION MECHANISM.
FILED NOV. 26, 1920.
1,443,991
2 SHEETS—SHEET 2
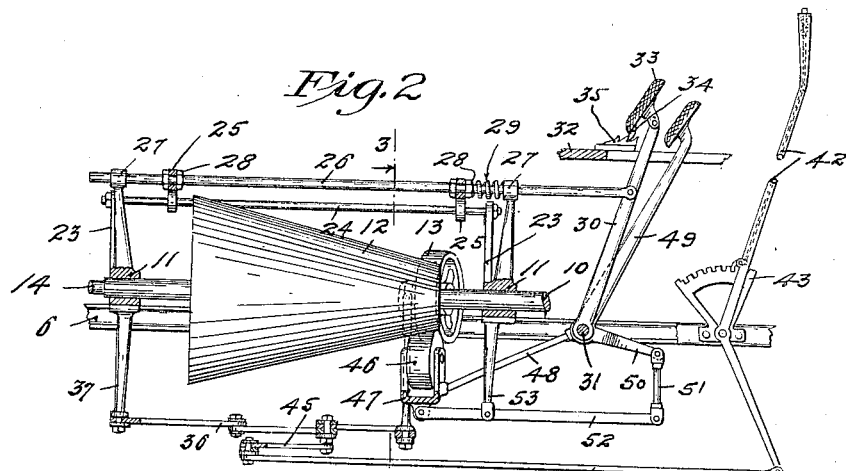
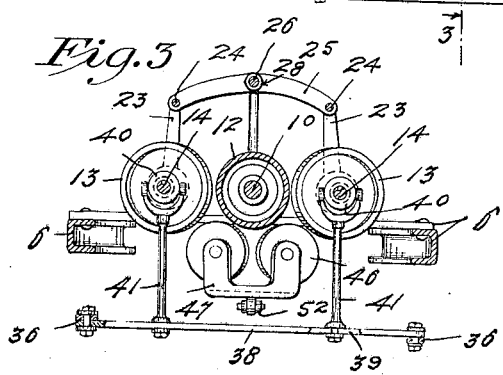
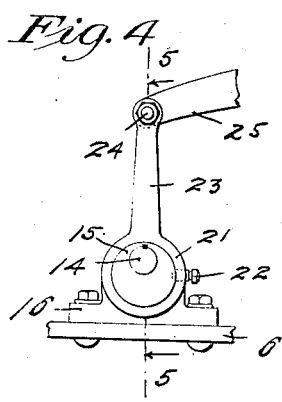 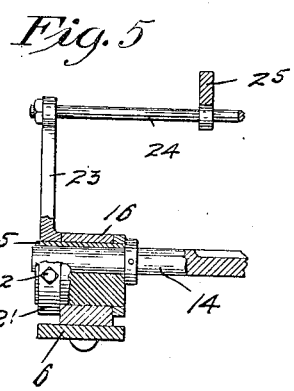
Inventor
Willard A. Hayden
By his Attorneys
Merchant, Kilgore & Kilgore Patented Feb. 6, 1923.

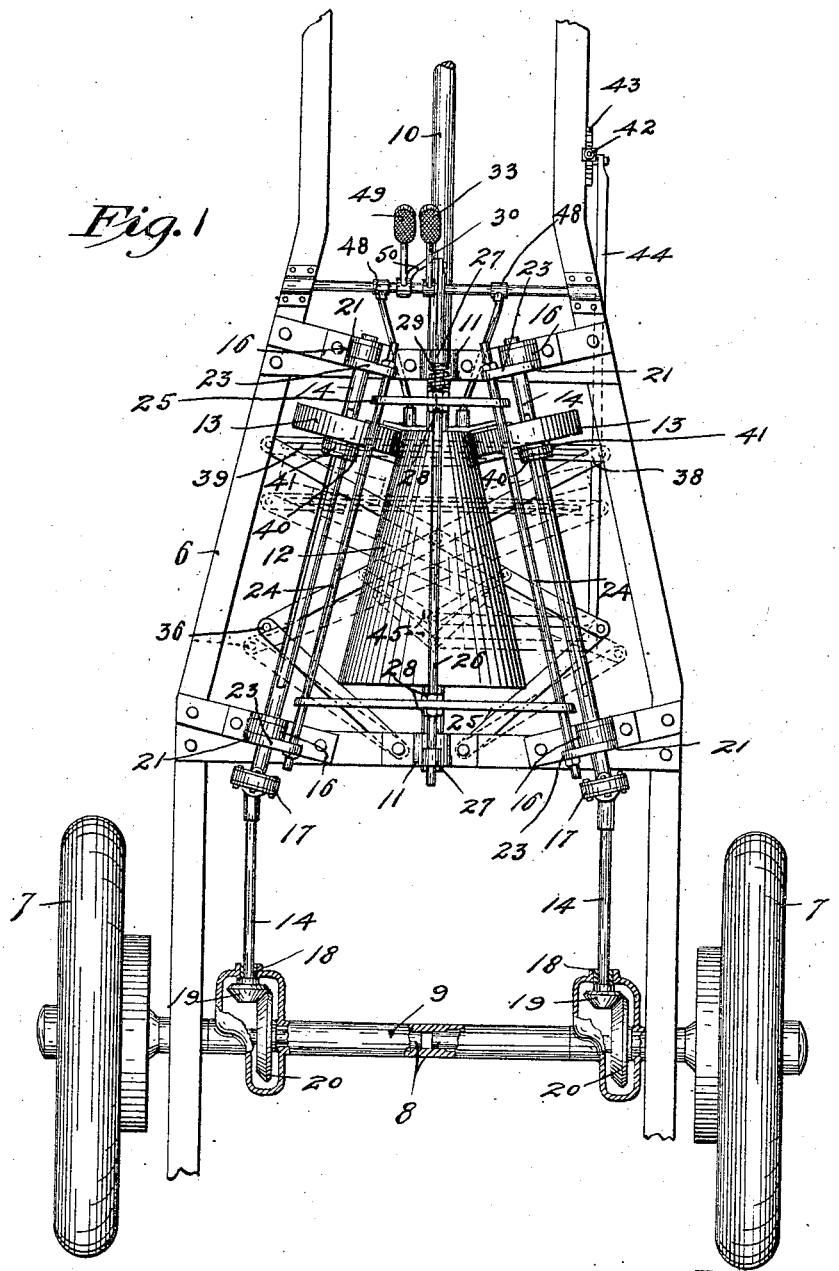

1,443,991

UNITED STATES PATENT OFFICE.

WILLARD A. HAYDEN, OF MINNEAPOLIS, MINNESOTA, ASSIGNOR, BY DIRECT AND MESNE ASSIGNMENTS, TO HAYDEN-DE WITZ MANUFACTURING COMPANY, A CORPORATION OF MINNESOTA.

DUPLEX FRICTIONAL TRANSMISSION MECHANISM.

Application filed November 26, 1920. Serial No. 426,588.

*To all whom it may concern:*

Be it known that I, WILLARD A. HAYDEN, a citizen of the United States, residing at Minneapolis, in the county of Hennepin and State of Minnesota, have invented certain new and useful Improvements in Duplex Frictional Transmission Mechanism; and I do hereby declare the following to be a full, clear, and exact description of the invention, such as will enable others skilled in the art to which it appertains to make and use the same.

My invention has for its object to provide an improved transmission mechanism for automobiles and other motor-propelled vehicles, and to such ends, generally stated, the invention consists of the novel devices and combinations of devices hereinafter described and defined in the claims.

More definitely stated, my invention provides what may be properly designated as a duplex reversible variable speed frictional transmission mechanism. The transmission mechanism includes a power-driven frictional driving cone, and on opposite sides thereof, co-operating axially adjustable driven friction wheels. These two driven wheels, through suitable co-operating shafts and gears, independently drive traction wheels on opposite sides of the machine. These two driven friction wheels, although they independently drive the traction wheels on opposite sides of the machine, nevertheless, operate simultaneously, so that power is always available on both traction wheels and at least one of the traction wheels will always be operative, even though the other traction wheel should be on a slippery spot or in a deep rut. This arrangement eliminates the use of a differential gear and, by doing so, not only simplifies the construction but improves the operation in several respects.

In the frictional transmission mechanism, there is always a certain percentage of slippage between the co-operating frictional engaging elements, and it has been found that, in a transmission mechanism of the character herein disclosed, in turning curves, the difference between the speeds of the inside and outside traction wheels will be automatically taken care of by variation produced in the slippage and this without causing the traction wheels to slip on the road.

By placing the two driven friction wheels at diametrically opposite sides of the driving cone and by producing equal frictional pressure between both wheels and the cone, tendency of the cone to vibrate is neutralized, or, in other words, prevented, and thus, the machine, is not only relieved from annoying vibrations, but the power frequently wasted in vibrations is here conserved and converted into driving force.

In the accompanying drawings, which illustrate the invention, like characters indicate like parts throughout the several views.

Referring to the drawings:

Fig. 1 as a fragmentary plan view of the invention, with some parts sectioned;

Fig. 2 is a view partly in elevation and partly in vertical section;

Fig. 3 is a transverse section taken on the line 3—3 of Fig. 2;

Fig. 4 is a front end elevation of one of the secondary driving shafts; and

Fig. 5 is a view principally in vertical section taken on the line 5—5 of Fig. 4.

The numeral 6 indicates the frame of an automobile and the numeral 7 indicates a pair of rear traction wheels, each of which is secured to a rear axle 8 journaled in a housing 9. A primary driving shaft 10, from an engine, not shown, is journaled in a pair of bearings 11, on the transverse members of the frame 6. Secured to the shaft 10 for rotation therewith, between the bearings 11, is a driving friction cone 12. A pair of peripheral driven friction wheels 13 is keyed to the front sections of a pair of two-part secondary driving shafts 14 with freedom for axial sliding movement thereon, and arranged to be moved into contact with the driving friction cone 12, at diametrically opposite points. It is highly important to note that the driven friction wheels 13 extend at right angles to the surface of the driving friction cone 12, with which they engage.

The front sections of the secondary driving shafts 14 have the same divergence as the driving friction 12 and rigidly secured to each thereof is a pair of eccentrics 15 mounted in bearings 16 on the frame 6. The sections of the secondary friction shafts 14 are connected by universal joints 17 and the rear sections of said shafts are journaled in thrust bearings 18 in the housing 9 and have secured thereto bevel friction pinions 19 which mesh with bevel friction gears 20 keyed to the rear axles 8. Mounted on each eccentric 15 is an eccentric strap 21 held in different circumferential adjustment thereon by a set screw 22 and having formed therewith a radially projecting arm 23. The two arms 23, on the two eccentrics 15 of each secondary driving shaft 14, are connected by a combined tie and cam rod 24.

To operate all four of the eccentrics 15 and thereby move the front sections of the secondary shafts 14 laterally to simultaneously press the driven friction wheels 13 against the converging surface of the driving friction cone 12 or release the same therefrom, the cam rods 24 are connected, near their front and rear ends, by a pair of cam bars 25 having in their ends oblique seats through which said cam rods 24 project. These cam bars 25 are connected and held laterally spaced by an operating rod 26, which extends through apertures in the transverse centers thereof and is mounted for endwise sliding movements in bearings 27 on the frame 6. Opposing nuts 28, on the operating rod 26, rigidly and securely hold the cam bars 25 therebetween. In some instances, it might be desirable to further connect the cam bars 25, near their extremities, by tie rods, not shown.

A coiled spring 29, encircling the operating rod 26, is compressed between the front bearing 27 and foremost nut 28 and normally holds the eccentrics 15, through the cam rods 24 and cam bars 25, with the driven wheels 13 out of contact with the driving cone 12. To move the operating rod 26 forward against the tension of the spring 29 and thereby cause the connected cam bars 25 to oscillate the eccentrics 15 and move the driven friction wheels 13 into engagement with the driving friction cone 12, there is provided a lever 30, to the intermediate portion of which said operating rod 26 is pivoted. This lever 30 is fulcrumed to a transverse rod 31 secured to the frame 6 with its upper end working through a slot in a foot board 32. A foot pedal 33 is pivoted to the lever 30 and, to hold said lever in different adjustments, said pedal is provided with a dog 34 arranged to be moved into and out of interlocking engagement with a ratchet bar 35 on the foot board 32.

The following described connections are provided for moving the driven friction wheels 13 axially on the secondary driving shafts 14 for engagement with different axially spaced points on the surface of the driving friction cone 12. These connections include horizontally disposed lazy tongs 36 underlying the driving cone 12 and having their rear ends pivoted to a pair of depending posts 37 secured to the rear transverse member of the frame 6. The forward ends of the lazy tongs 36 are pivotally connected by a transverse tie bar 38 having a longitudinally extended slot 39. Suspended from shipper collars 40, on the driven friction wheels 13, is a pair of shipper posts 41, the lower ends of which are pivoted in the slot 39 of the bar 38 for sliding movement therein. These posts 41 also support the tie bar 38 and, hence, the front ends of the lazy tongs from the driven friction wheels 13.

To retract or extend the lazy tongs 36, there is provided a latch lever 42 intermediately pivoted to a co-operating latch segment 43 on the frame 6. The short or lower end of the lever 42 has pivoted thereto a long link 44, the rear end portion of which is bent laterally inward and pivotally connected to the lazy tongs 36 by a pair of short links 45.

To impart reverse driving action to the rear traction wheel 7, there is provided a pair of intermediate friction wheels 46 journaled in a floating bearing 47. These intermediate wheels 46 are held by connecting the bearing 47 to the rod 31 by a pair of rods 48, so that said wheels may be brought into engagement with the driving friction cone 12 and driven friction wheels 13 when said wheels are out of engagement with the driving friction cone 12 and in low speed. The forward ends of the rods 48 are pivoted to the rods 31 so that they will freely move and not interfere with the floating action of the bearing 47. The intermediate wheels 46 are held inoperative or, in other words, out of engagement with the driving friction cone 12 and driven friction wheels 13 under the action of gravity.

To lift the bearing 47 and thereby simultaneously carry the intermediate gears 46 into engagement with the driving friction cone 12 and driven friction wheels 13, there is fulcrumed to the rod 31 a foot pedal 49, which works through the slot in the foot board 32. On the lower end of the foot pedal 49 is a forwardly and downwardly inclined arm 50 to which is pivoted the upper end of a short vertical link 51. The lower end of the link 51 is pivoted to the forward or long end of a lever 52 intermediately pivoted to the lower end of a depending post 53 secured to the frame 6. The rear or short end of the lever 52 is pivoted to the bearing 47. Obviously, by pressing down on the foot pedal 49, the intermediate wheels 46 may be lifted into engagement with the driving friction cone 12 and driven wheels 13 to impart rearward driving movement to the rear traction wheel 7 and when said foot pedal is released, the wheels 46 will immediately drop out of engagement with said cone 12 and wheels 13.

The operation of the above described transmission mechanism may be briefly described as follows:

As previously stated, the spring 29 normally holds the operating rod 26 in position with the driven friction wheels 13, out of contact with the driving friction cone 12 and the intermediate wheels 45 are also normally held in inoperative positions. When the latch lever 42 is set in its foremost position, as shown in Fig. 2, the driven friction wheels 13 are positioned for low speed and to bring said wheels 13 into engagement with the driving friction cone 12, it is only necessary to press the foot pedal 33 down. To increase the speed, the lever 42 may be drawn rearward, and which movement, through the connections previously described, retracts the lazy tongs 36 which carry the driven friction wheels 13 by means of the shipper posts axially on the secondary driving shafts 14. Obviously, as the driven friction wheels 13 are moved axially on the diverging secondary driving shafts 14, the shipper posts 41 are free to move laterally on the tie bar 38, due to their sliding connection in the slot 39 thereof.

To reverse the rear traction wheels 7, the driven friction wheels 13 are set in low speed position out of engagement with the driving friction cone 12 and the foot pedal 49 operated to lift the intermediate gears 46 into engagement with the driving friction cone 12 and driven friction wheels 13.

This same reverse position of the parts just described may be used as a powerful brake on the rear traction wheels 7 to stop the advance movement of the vehicle.

The invention eliminates all expensive transmission and differential mechanisms, thereby greatly reducing the initial cost, and it will outwear toothed gears now used, is much more quiet and, at the same time, eliminates the use of lubricants. The use of friction transmission mechanism makes it possible to start and stop without the slightest shock.

As the leverage of the rear traction wheels 7 is much greater than that of the driven friction wheels 13 or pinions 19, all slippage will be taken by said driven friction wheels and pinions, thus avoiding spinning of the rear traction wheels resulting in the damaging of the tires applied thereto. It is, of course, understood that ordinary toothed pinions and gears may be substituted for the friction pinions and gears 19 and 20 illustrated.

While the invention is shown incorporated in a motor-propelled vehicle, it may be used for driving various different kinds of machinery, in which case the rear sections of the secondary driving shafts 14 will be eliminated and the converging ends of the front sections of said shaft extended into close relation in respect to each other and connected to a common driven shaft or other element.

By duplicating the mechanism shown in the accompanying drawings, the invention may be readily incorporated in a four-wheel drive vehicle.

What I claim is:

1. In a motor-propelled vehicle, the combination with a frame and propelling wheels on opposite sides thereof, of a motor-driven friction cone, friction wheels engageable with and driven from diametrically opposite sides of said cone, independent connections from said friction wheels to said propelling wheels for driving the same, and means including positive connections between said wheels for moving said friction wheels into engagement with said cone.

2. In a motor-propelled vehicle, the combination with a frame and propelling wheels on opposite sides thereof, of a motor-driven friction cone, independent converging shafts located on diametrically opposite sides of said cone and parallel to the converging surface thereof, said converging shafts being independently connected to said propelling wheels for driving the same, friction wheels rotatable with but adjustable on said converging shafts, said friction wheels being driven from opposite sides of said cone, means for simultaneously adjusting said driven friction wheels on said shafts to vary the speed transmission, means for moving the friction wheels into and out of engagement with the cone without changing the angularity of said wheels and yielding means under strain to move the friction wheels into engagement with the cone.

3. In a motor-propelled vehicle, the combination with a frame and propelling wheels on opposite sides thereof, of a motor-driven friction cone, independent converging shafts located on diametrically opposite sides of said cone and parallel to the converging surface thereof, said converging shafts being independently connected to said propelling wheels for driving the same, friction wheels rotatable with but adjustable on said converging shafts, said friction wheels being driven from opposite sides of said cone, and cam-acting devices operative for simultaneously pressing said driven friction wheels against said cone while permitting adjustments thereof.

4. In a motor-propelled vehicle, the combination with a frame and propelling wheels on opposite sides thereof, of a motor-driven friction cone, friction wheels engageable with and driven from diametrically opposite sides of said cone and extending at right angles to the contacting surfaces thereof, independent connections from said friction wheels to said propelling wheels for driving the same, and means for moving said friction wheels into and out of engagement with said cone without changing the angularity thereof, said means including positive connections between the friction wheels for holding the same in engagement with said cone.

5. In a motor-propelled vehicle, the combination with a frame and propelling wheels on opposite sides thereof, of a motor-driven friction cone, independent converging shafts located on diametrically opposite sides of said cone and parallel to the converging surface thereof, said shafts being independently connected to said propelling wheels for driving the same, friction wheels rotatable with but adjustable on said converging shafts, means for simultaneously adjusting the friction wheels axially on said shafts, and means for simultaneously moving said friction wheels into engagement with said cone.

6. In a motor-propelled vehicle, the combination with a frame and propelling wheels on opposite sides thereof, of a motor-driven friction cone, independent converging shafts located on diametrically opposite sides of said cone and parallel to the converging surface thereof, said converging shafts being independently connected to said propelling wheels for driving the same, friction wheels rotatable with but adjustable on said converging shafts, said friction wheels being driven from opposite sides of said cone, cam-acting devices operative for simultaneously pressing said friction wheels against said cone, and yielding means operative on said cam-acting devices for moving said friction wheels out of engagement with said cone.

7. In a motor-propelled vehicle, the combination with a frame and propelling wheels on opposite sides thereof, of a motor-driven friction cone, friction wheels engageable with and driven from diametrically opposite sides of said cone, independent connections from said two driven friction wheels to the said propelling wheels for simultaneously but independently driving the same, means for adjusting said driven friction wheels on the converging surface of said cone, means for adjusting the driven friction wheels into and out of engagement with the converging surfaces of said cone, and other wheels simultaneously operative to reverse said independent connections.

8. In a motor-propelled vehicle, the combination with a frame and propelling wheels on opposite sides thereof, of a motor-driven friction cone, eccentrics mounted in bearings on said frame, independent converging shafts mounted in said eccentrics and located on diametrically opposite sides of said cone and parallel to the converging surface thereof, said converging shafts being independently connected to said propelling wheels for driving the same, friction wheels rotatable with but adjustable on said converging shafts, cross connections between said eccentrics, and means operative on said cross connections for simultaneously moving the friction wheels into engagement with said cone.

9. In a motor-propelled vehicle, the combination with a frame and propelling wheels on opposite sides thereof, of a motor-propelled friction cone, arm-equipped eccentrics mounted in bearings in said frame, independent converging shafts mounted in said eccentrics and located on diametrically opposite sides of said cone and parallel to the converging surface thereof, said converging shafts being independently connected to said propelling wheels for driving the same, friction wheels rotatable with but adjustable on said converging shafts, cam rods connecting the arms of the eccentrics on each side of said cone, cam bars connecting said cam rods, and means operative on said cam bars to simultaneously move said friction wheels into engagement with said cone.

10. In a motor-propelled vehicle, the combination with a frame and propelling wheels on opposite sides thereof, of a motor-driven friction cone, friction wheels engageable with and driven from diametrically opposite sides of said cone, independent connections from said driven friction wheels to said propelling wheels for driving the same, means for moving the friction wheels into engagement with said cone, a bearing, a pair of intermediate friction wheels journaled on said bearing, and means for moving the bearing to cause the intermediate friction wheels to engage said cone and the first noted friction wheels.

11. In a motor-propelled vehicle, the combination with a frame and propelling wheels on opposite sides thereof, of a motor-driven friction cone, friction wheels engageable with and driven from diametrically opposite sides of said cone, independent connections from said friction wheels to said propelling wheels for driving the same, and reverse mechanism for connecting the friction wheels to said cone.

In testimony whereof I affix my signature.

WILLARD A. HAYDEN.